(12) United States Patent
Gaid et al.

(10) Patent No.: US 9,249,035 B2
(45) Date of Patent: Feb. 2, 2016

(54) METHOD AND SYSTEM FOR TREATING WATER IN ORDER TO REDUCE ITS ENDOCRINE DISRUPTING EFFECT BY MEANS OF A LIVING ORGANISM

(71) Applicants: Abdelkader Gaid, Paris (FR); Philippe Sauvignet, Saint-Etienne en Cogles (FR)

(72) Inventors: Abdelkader Gaid, Paris (FR); Philippe Sauvignet, Saint-Etienne en Cogles (FR)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 58 days.

(21) Appl. No.: 14/049,576

(22) Filed: Oct. 9, 2013

(65) Prior Publication Data

US 2014/0097140 A1  Apr. 10, 2014

(30) Foreign Application Priority Data

Oct. 9, 2012  (FR) ...................................... 12 59608

(51) Int. Cl.

| | |
|---|---|
| *C02F 1/28* | (2006.01) |
| *C02F 1/00* | (2006.01) |
| *C02F 1/32* | (2006.01) |
| *C02F 1/52* | (2006.01) |
| *C02F 1/72* | (2006.01) |
| *C02F 1/78* | (2006.01) |
| *C02F 3/00* | (2006.01) |
| *C02F 101/30* | (2006.01) |

(52) U.S. Cl.
CPC . *C02F 1/28* (2013.01); *C02F 1/008* (2013.01); *C02F 1/283* (2013.01); *C02F 1/32* (2013.01); *C02F 1/5245* (2013.01); *C02F 1/722* (2013.01); *C02F 1/78* (2013.01); *C02F 3/00* (2013.01); *C02F 2101/305* (2013.01); *C02F 2209/001* (2013.01); *C02F 2209/003* (2013.01); *C02F 2303/08* (2013.01); *C02F 2305/10* (2013.01)

(58) Field of Classification Search
CPC .................................................. C02F 2209/001
USPC .................................................. 210/601–602
See application file for complete search history.

(56) References Cited

U.S. PATENT DOCUMENTS

| | | | | |
|---|---|---|---|---|
| 2002/0104787 | A1* | 8/2002 | Murayama et al. | ............. 210/94 |
| 2006/0101528 | A1* | 5/2006 | Demeneix et al. | ................ 800/8 |
| 2008/0046127 | A1* | 2/2008 | Piironen et al. | ............... 700/271 |

(Continued)

FOREIGN PATENT DOCUMENTS

FR  2935697 A1 *  3/2010

OTHER PUBLICATIONS http://web.archive.org/web/20120114073012/http://www.watchfrog.fr/technology/index_en.html, archived Jan. 14, 2012, downloaded Mar. 25, 2015.*

(Continued)

*Primary Examiner* — Chester Barry
(74) *Attorney, Agent, or Firm* — Coats and Bennett PLLC

(57) ABSTRACT

A method of treating water to reduce pollutants comprises mixing an adsorbent reagent with the water to form a water-adsorbant reagent mixture. Thereafter, subjecting the mixture to a liquid-solids separation process that produces treated water and sludge. The method further includes contacting the water or treated water with a living aquatic organism wherein the value of at least one property of the organism is correlated to the concentration of pollutants in the water. This value is evaluated and the method entails adjusting the quantity of adsorbent reagent mixed with the water as a function of the value of the property.

16 Claims, 3 Drawing Sheets

(56) References Cited

U.S. PATENT DOCUMENTS

| | | | | |
|---|---|---|---|---|
| 2008/0129998 | A1* | 6/2008 | Johnson | 356/338 |
| 2010/0044285 | A1* | 2/2010 | Fukuda et al. | 210/86 |
| 2011/0005284 | A1* | 1/2011 | Conner et al. | 71/12 |
| 2011/0094963 | A1* | 4/2011 | Tada et al. | 210/636 |
| 2011/0163045 | A1* | 7/2011 | Mamane et al. | 210/748.1 |
| 2014/0097140 | A1* | 4/2014 | Gaid et al. | 210/662 |

OTHER PUBLICATIONS http://web.archive.org/web/20120114072917/http://www.watchfrog.fr/company/activities_en.html, archived Jan. 14, 2012, downloaded Mar. 25, 2015.* http://web.archive.org/web/20120114073025/http://www.watchfrog.fr/solutions/enviro_en.html, archived Jan. 14, 2012, downloaded Mar. 25, 2015.*

"Overall Diagnosis of water," Watchfrog, dated 2006, www.watchfrog.fr. (archived page available Jan. 14, 2012), http://web.archive.org/web/20120114073115/http://www.watchfrog.fr/docs/WF_environmental_Eng_4.*

Gruver, M., "Engineered Glowing Tadpoles Detect Pollution," US News, Dec. 28, 2009.*

Fini, et al., "An In-vivo Multiwell-Based Fluorescent Screen for Monitoring Vertebrate Thyroid Hormone Disruption," Environ. Sci., Technol. 2007, 41, 5908-5914.*

Fini, et al., "An Innovative Continuous Flow System for Monitoring Heavy Metal Pollution in Water Using Transgenic Xenopus laevis Tadpoles,", Environ. Sci., Technol. 2009, 43, 8895-8900.*

* cited by examiner

METHOD AND SYSTEM FOR TREATING WATER IN ORDER TO REDUCE ITS ENDOCRINE DISRUPTING EFFECT BY MEANS OF A LIVING ORGANISM

This application is a U.S. National stage Application based on French Patent Application No. 12259608 filed 9 Oct. 2012. The subject matter of this application is incorporated herein.

1. FIELD OF THE INVENTION

The field of the invention is that of the treatment of both urban and industrial wastewater.

More specifically, the invention pertains to a method for treating water in order to reduce its content in pollutants capable of introducing an endocrine disrupting effect and/or a toxic and/or genotoxic effect.

2. PRIOR ART

Methods for treating urban and/or industrial wastewater degrade the essential part of the organic pollution that they contain. However, most of the present-day methods are aimed at reducing the concentration of the various organic compounds contained in this water, without taking account of the possible production of byproducts of degradation. The residual organic compounds and such byproducts of degradation can have additional, synergistic or antagonistic biological effects that are not reflected in a simple value of their concentration in water.

Certain of these organic compounds, known as "endocrine disruptors" or "substances with endocrine disrupting effects" have proved to be toxic for the living species exposed to them, especially aquatic organisms in environments that receive discharges from water purification plants. These compounds consist of natural or man-made molecules which have hormone mimetic properties: they get bound with natural hormone receptors and thus interfere with one or more hormonal processes controlling, for example, behavior, protein synthesis, secretion, the transport of molecules, reproduction and other life processes. Their toxic or even genotoxic effects may have an impact on the organism as well as the progeny of an exposed individual.

For the sake of environmental conservation and, as a corollary, for the conservation of human health, eliminating this endocrine disrupting and/or toxic and/or genotoxic effect in urban and/or industrial wastewater has become a major goal of methods for treating this water.

One of the goals of these treatments therefore is to eliminate organic matter. In addition to eliminating pathogenic microorganisms, the treatment processes generally applied as end-of-line treatments have intensified the elimination of these organic substances to the utmost extent.

The prior art proposes different methods for treating water implementing chlorinated compounds, ozone, ultraviolet radiation etc. In particular, there are known ways of implementing a step of adsorption of the organic compounds contained in the water to be treated by activated carbon, also known as active carbon or a step of adsorption and/or exchange (ion exchange) using synthetic resins or natural elements such as zeolites. These treatments are sometimes combined with a step of oxidation of organic compounds by ozone, hydrogen peroxide or ultraviolet radiation in order to facilitate their degradation. The efficacy of these methods in reducing endocrine disruptors in water is evaluated by complex and particularly costly laboratory measurements. Apart from the cost of these analyses, their results are not available for at least a week. This particularly lengthy period prevents any rapid response by the operators on the water processing chain and especially prevents the dose of reagents injected into the water that is to be treated from being adjusted to the quality of the incoming water. Consequently, and because of the principle of precaution, the adsorbent reagents are injected in high doses, and this considerably increases the cost of the method for treating water.

In addition, these analyses cannot be done continuously: only samples collected at regular intervals undergo these tests. The information obtained is then not completely reliable since it reflects only a situation at a given time. In no case does it reflect the true quality of the water on a continuous basis.

Another drawback of this technique is that only some endocrine disruptors and toxic and/or genotoxic compounds are tested. Now, there are thousands of molecules implicated in these phenomena that can impact on human health and the environment, and not all are listed. Besides, certain compounds may have no impact on the organism or the environment on their own but have a particularly deleterious effect on health and environment in the presence of other compounds. Laboratory analyses, aimed at determining the presence and concentration per compound of an endocrine disrupting effect and/or toxic effect and/or genotoxic effect therefore cannot show up this synergistic effect.

It is for this purpose that alternative methods, based on the observation of living animal organisms in these waters, have been implemented. Certain of these methods are based on the observation of the behavior of the animals (such as daphnia and trout fingerlings) and their modifications in order to deduce a disruptive effect from such observation.

Other methods use population counts to show up abnormal mortality rates and relate this observation to possible toxicity in the water. However, these methods remain completely random because different parameters can come into play and not all are fully controlled. They therefore cannot be used to clearly link the observations made on animals with the possible presence of a pollutant compound in water. In addition, these types of tests have a very high frequency of "false positive" results. In addition, the results of these observations cannot be just exploited according to a simple dose-response relationship. These methods are moreover costly because they require constant monitoring of the organisms.

3. GOALS OF THE INVENTION

The invention is aimed especially at overcoming these drawbacks of the prior art.

More specifically, it is a goal of the invention, in at least one embodiment, to provide a method for treating water enabling the elimination, or at the very least the diminishing, of the presence of compounds having an endocrine disrupting and/or toxic and/or genotoxic effect in the water treated.

It is another goal of the invention, in at least one embodiment, to implement a method that enables the speedy adjustment, within a few tens of minutes or even instantaneously, of the dose of injected reagents.

It is yet another goal of the invention, in at least one embodiment, to implement a method for treating water that takes account of the real situation of the pollution of water.

It is also a goal of the invention, in at least one embodiment, to implement a method for treating water that is simple to implement.

4. SUMMARY OF THE INVENTION

These goals as well as others that shall appear hear below are achieved by means of a method for treating water to be treated in order to reduce its content in pollutants liable to introduce an endocrine disrupting effect and/or a toxic and/or genotoxic effect, said method comprising:

a step of adsorption in which said water to be treated is brought into contact with a quantity of at least one adsorbent reagent producing a mixture of water and adsorbent reagent;

a step of liquid-solid separation of said mixture producing treated water and sludge.

According to the invention, said step of adsorption is preceded and/or said step of liquid-solid separation is followed by a step for bringing said water to be treated and/or said treated water respectively into contact with at least one living aquatic organism, the value of at least one property of said living organism being correlated with a concentration in said pollutants of said water to be treated and/or said treated water;

said method further comprising:

a step for continuously evaluating the value of said property;

a step for adjusting the quantity of adsorbent reagent mixed into the water during said step of adsorption according to said value obtained at said step for evaluating.

Thus, the invention relies on a wholly novel and original approach in which a step of adsorption of the organic compounds having a toxic and/or genotoxic and/or endocrine disruptive effect is associated with a step for detecting these compounds continuously and in real time by placing the treated water or the water to be treated in contact with living organisms. The use of living organisms to detect the presence of at least one compound having an endocrine disruptive and/or toxic and/or genotoxic effect enables the detection of such a compound even in a low concentration. It also makes it possible to show up any possible toxic or disruptive effect that would result from the synergy of the different compounds, which cannot be done by current laboratory analyses. Finally, it also provides significant, reliable and quick results that reflect the reality of the pollution of water in a predictive manner.

This step for detecting pollution by living organisms, especially when placed upstream to the adsorption step, is aimed at detecting the presence of pollutant compounds having a possible endocrine disruptive and/or toxic and/or genotoxic effect. It can also be used to control the injection of adsorbent reagents and their quantity in the water to be treated and therefore to automatically adjust this quantity especially in case of the occurrence of major pollution in the water to be treated. It is therefore no longer necessary to systematically inject strong doses of adsorbent reagents into the water to be treated. This enables substantial savings. However, in the event of heavy pollution of water by compounds having an endocrine disruptive and/or toxic and/or genotoxic effect, the method of the invention can be used to increase the quantity of reagents to be injected accordingly. The method of the invention improves the responsiveness of the method for treating water to variations in the quality of water entering the plant.

When the step for detecting is placed at the exit from the plant for treating water, it can be used to evaluate the efficacy of the method for treating water and its capacity to eliminate or at least to diminish the concentration in endocrine disrupting and/or toxic and/or genotoxic compounds. It also makes it possible to set up a loop for regulating the quantity of adsorbent reagents injected into the water to be treated. Indeed, in the event of major pollution of water, the quantity of adsorbent reagents may be undervalued and the presence of compounds having an endocrine disrupting and/or toxic and/or genotoxic effect can persist. The detection of this anomaly enables the automatic and speedy correction of the quantity of adsorbent reagents to be injected into the treated water. It also makes it possible to determine when the doses of adsorbent reagents can be reduced again when the pollution peak is over.

The method according to the invention therefore offers a solution for treating waste water. On the one hand, it makes it possible to treat the water and to eliminate, or at the very least reduce, the concentration in this water of compounds harmful to human health and the environment through a step for the adsorption of these compounds. On the other hand, it makes it possible to evaluate the efficiency of the method implemented and more finely regulate the dose of adsorbent reagents injected into the water to be treated.

Thus, the method according to the invention increases responsiveness to variations in the quality of the incoming water, optimizes the quantities of adsorbent reagents injected according to the quality of the incoming water.

Examples that may be cited of adsorbent reagents appropriate for implementing the invention include powdered activated carbon (PAC), synthetic resins, zeolites, etc. Preferably, the adsorbent is PAC.

In an interesting variant of the invention, the method further comprises a step of chemical oxidation in which the injection of a chemical oxidant is done upstream to or during the adsorption step, the quantity of said chemical oxidant to be injected being determined by said step for continuously evaluating the value of said property. Examples that may be cited of chemical oxidants suited to implementing the invention include ozone, air and hydrogen peroxide. Preferably, the oxidant used is ozone alone or combined with an addition of hydrogen peroxide ($H_2O_2$). Another embodiment comprises the pre-treatment of water to be treated by ultraviolet radiation combined with an injection of ozone, hydrogen peroxide or titanium oxide ($TiO_2$).

Oxidants such as ozone and hydrogen peroxide are known to be "harmful" to living organisms. However, the inventors have noted that oxidation-adsorption coupling enables the production of water without any oxidant residue. As a consequence, this oxidation step is not dangerous to living organisms. Oxidant can thus be injected either directly into the adsorption tank or upstream to the tank via a static mixer.

In one advantageous embodiment, the quantity of adsorbent agent mixed with water during said step of adsorption is proportional to said value obtained at said step for evaluating. This embodiment enables the quantity of adsorbent reagents to be adjusted very precisely to the variations occurring in the quality of the water to be treated. Substantial savings are thus obtained in the quantity of reagents used.

In another useful embodiment, the injection of said adsorbent reagent into said water to be treated is activated when said value obtained at said step for evaluating becomes greater than or equal to a predetermined threshold.

This embodiment can also make it possible to adapt the quantity of adsorbent reagents and/or chemical oxidant to be injected to the quality of the water to be treated. Setting a threshold at which the injection is activated could be correlated with the existence of a standard defining an acceptable pollution threshold. It would thus be possible to set an activation threshold according to the threshold of established physiological impact on sexual speciation of fish or else the metamorphosis of amphibians.

Preferably, said step for adjusting the quantity of adsorbent reagent mixed with water during said step of adsorption is performed as a function of said value obtained at said step for evaluating resulting from the bringing of said water to be treated into contact with said living organism.

This characteristic can be used to regulate the dose of adsorbent reagents and chemical reagents that is to be injected into the water according to the quality of the water entering the plant for treating water. The characteristic is therefore particularly important when the step for detecting compounds having an endocrine disrupting and/or toxic and/or genotoxic effect by the at least one living organism is performed upstream to the step of adsorption of these compounds.

Advantageously, the method according to the invention comprises a step for controlling the quality of said treated water produced, said step for controlling comprising a sub-step for determining a piece of information representing the quality of said treated water as a function of said value obtained at said step for evaluating resulting from the bringing of said treated water into contact with said living organism.

The method of the invention also makes it possible to continuously assess the water treated in order to evaluate its quality when it exits the plant and the performance of the method implemented. These items of data on quality are important for a regular tracking of quality of the plants and an evaluation of the performance of the method implemented.

Advantageously, said property is a visual signal emitted by said living organism, the intensity of which can be quantified and correlated with the concentration of said water to be treated in said pollutants.

The measurement of a visual signal and the quantification of its intensity can be easily implemented by existing devices that are particularly reliable. Thus, the method according to the invention makes it possible to express the pollution of water in a clearly identifiable and quantifiable signal.

Preferably, that said visual signal is fluorescence.

In this embodiment, the fluorescence can be emitted by at least one aquatic organism, the genome of which will have been modified to react to the presence of at least one endocrine disrupting and/or toxic and/or genotoxic compound. The emission of fluorescence can be either proportional to the concentration in endocrine disrupting and/or toxic and/or genotoxic compound or correlatable with the presence of such a compound without reflecting its real concentration in water. Furthermore, this fluorescence can be linked to an established threshold known as the threshold of physiological impact either on the sexual speciation of fish (OECD tests 229+230) or on the metamorphosis of amphibians (OECD test 231).

In a preferred embodiment, said step or steps for evaluating are implemented in situ. Thus, the method of the invention can easily be implemented in pre-existing plants. Besides, the risk of disseminating genetically modified aquatic organisms is thus eliminated.

Advantageously, that said aquatic organism is a genetically modified aquatic organism.

Preferably, said aquatic organism is in the embryonic state. Such embryonic aquatic organisms have the advantage of being partly transparent. This makes it easier to read their fluorescence when it occurs. The use of aquatic organisms at the embryonic stage makes it possible especially to detect compounds having a deleterious effect on fetuses and embryos only. This also makes it possible to observe the development of embryos subjected to these pollutants and to link pollution levels with precise effects on the organism. Preferably, the aquatic organism at the embryonic stage enables the detection of any noxious compound, whatever its concentration in water. This is thus an ethical alternative to animal experimentation, since the embryos have no cortex and therefore do not feel pain. This aspect is very important when the presence of an endocrine disruptor has to be detected, for these compounds, even in small doses, have the particular feature of impacting on the development and functioning of living organisms. In addition, the detection has a characteristic of enabling prediction of possible future malformation at the adult stage through knowledge of the physiological development of the embryos.

In a more preferred embodiment, said living organism belongs to the group comprising fish and amphibians. Indeed, these organisms appear to be particularly sensitive to endocrine disruptors. A phenomenon of sex reversal has already been observed in amphibian larvae.

Another aspect of the invention also comprises a plant for treating water for implementing a method according to the invention, characterized in that it comprises:

a zone of treatment by adsorption comprising means for injecting at least one adsorbent reagent into said water to be treated;

a zone of liquid-solid separation, the inlet of which communicates with the outlet of said zone of treatment by adsorption, said zone of liquid-solid separation comprising means for discharging treated water and means for extracting sludge;

a zone for bringing said water to be treated and/or said treated water into contact with at least one living aquatic organism, the value of at least one property of said living organism being correlated with the concentration in said pollutants of said water to be treated and/or said treated water;

means for continuously evaluating the value of said property;

means for adjusting the quantity of adsorbent reagent injected into said water to be treated by said means for injecting as a function of said value obtained at said step for evaluating.

In one variant, the plant according to the invention also comprises means of chemical oxidation of the water to be treated, these means being chosen from among an ozonation tank situated upstream to said zone of treatment by adsorption, UV lamps and means for injecting a chemical oxidant upstream to or in the zone of treatment by adsorption.

Thus, the plant of the invention enables the quantity of adsorbent reagents and possibly of chemical oxidants to be injected into the water to be treated or the water treated to be adjusted to its level of pollution by the endocrine disrupting and/or toxic and/or genotoxic compounds. It also enables an evaluation of the efficacy of the method implemented on treated water at exit from the plant.

In an advantageous embodiment, said means for adjusting adjust the quantity of adsorbent reagent mixed with said water to be treated as a function of said value obtained by said means for evaluating resulting from the placing of said water to be treated in contact with said living organism.

This embodiment makes it possible to adjust the quantity of adsorbent reagents very precisely to the quantity of pollutant compounds in the incoming water. Thus, the treatment of the water is more efficient. At same time, it eliminates the wasting of reagents dictated by the principle of precaution when the water pollution is low.

Preferably, the plant of the invention comprises means for checking on the quality of said treated water, said control means comprising means for determining a piece of information representing the quality of said treated water as a function of said value obtained by said means for evaluating resulting from the placing of said treated water in contact with said living organism.

This characteristic makes it possible firstly to set up a loop for adjusting and regulating the quantity of adsorbent reagents to be injected into the water to be treated according to the quality of the treated water, i.e. water at exit from the plant. It also makes it possible to evaluate the efficiency of the method implemented and collect data useful to an understanding of the pollutants present in the water and their impact on health and the environment. It also makes it possible to verify that the water at exit is of a quality acceptable for distribution in the environment and possibly for reuse.

5. LIST OF FIGURES

Other features and advantages of the invention shall appear more clearly from the following description of a preferred embodiment given by way of a simple, illustrative and non-exhaustive example and from the appended drawings, of which:

6. EXAMPLES

The general principle of the invention relies on the use of aquatic and genetically modified living organisms capable of detecting the presence of an endocrine disrupting and/or toxic and/or genotoxic compound, whatever its concentration in water. The detection of this pollution and its quantification enable the performance levels of the method for treating water and especially the quantity of adsorbent reagents and possibly oxidants injected into the water to be treated to be very speedily adjusted to the quality of the water entering the plant. This method therefore makes it possible, in a first stage, to obtain substantial savings in the quantity of reagents used and produce higher-quality water. It also enables the speedy, precise and reliable detection of the presence of a compound harmful to the health of human beings, animals or the environment. It further provides for a better understanding of the mechanism of action of these compounds on living organisms.

6.1. Description of a First Embodiment of the Invention

Figure 1:
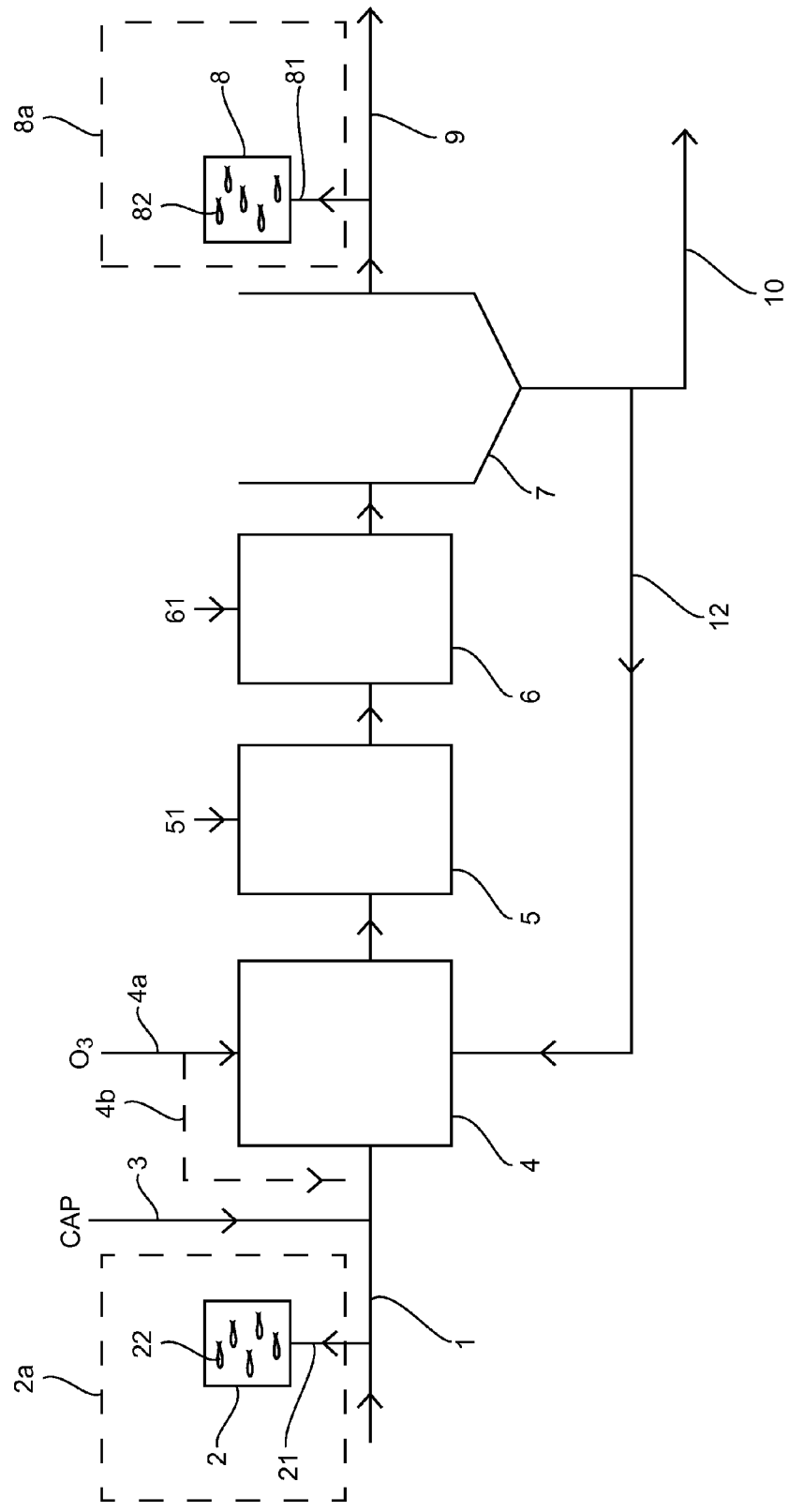
FIG. 1 is a block diagram of one embodiment of a plant for implementing the method according to the invention.

Referring now to FIG. 1, we present a first embodiment of a plant for implementing the method according to the invention.

The water to be treated enters a pipe 1. A part of the water to be treated is diverted by a pipe 21 to an upstream analysis cell 2. This analysis cell 2 has a basin containing water to be treated in which there move embryos of aquatic organisms 22 such as amphibian larvae or genetically modified fish fingerlings that are commercially available (GMO class 1). These embryos 22 emit fluorescence when they are in contact with an endocrine disrupting and/or toxic and/or genotoxic compound present in the water in which they are located. It can be noted that the upstream analysis cell 2 can be isolated by a confinement chamber 2a (shown in dashes in FIG. 1) in order to prevent these genetically modified organisms from escaping outwards. Preferably, the intensity of the fluorescence emitted by these aquatic organisms is proportional to the quantity of endocrine disrupting and/or toxic and/or genotoxic compounds.

The cell 2 also has a sensor capable of measuring the fluorescence emitted by the embryos 22. The measurement obtained is integrated by a regulation system (not shown).

A quantity of adsorbent reagent which is suitable for treating water in order to reduce its content in endocrine disrupting and/or toxic and/or genotoxic compounds and which, in the present embodiment, is powdered activated carbon (PAC) is introduced into the water to be treated. This injection of adsorbent reagent is done in the embodiment described here by means of a pipe 3 planned upstream to an adsorption tank 4 provided with stirring means (not shown). It will be noted that, in other embodiments, this injection can be done directly into the tank 4.

In this adsorption tank 4, the water is put into contact with the adsorbent reagent for about 10 minutes. This step of adsorption is preferably coupled with an oxidation step. In the framework of the embodiment described, the coupled oxidation is obtained by an injection of ozone which can be done directly into the tank 4 by a pipe 4a connected to diffusers (not shown) either by online injection upstream to the tank 4 or by means of a pipe 4b (shown in dashes in FIG. 1) and by means of a static mixer (not shown).

This step of adsorption makes it possible to fix a large part of organic compounds possibly having an endocrine disrupting and/or toxic and/or genotoxic effect on the particles of adsorbent reagent. It makes it possible additionally to eliminate a residue of oxidant that can be harmful to life and to embryo development.

After the adsorption step, the water undergoes a step of coagulation in a tank 5 into which a coagulant 51 is injected. This is followed by a step of flocculation in a tank 6 into which a flocculent 61 is injected. These steps are conducted by any method well known to those skilled in the art. The water is then conveyed to a solid/liquid separation system such as a lamellar decanter or separator 7 which enables the separation of the clarified and treated water 9 from the decantation sludge 10. It will be noted that it is possible to use any type of system of liquid/solid separation such as a filtration system which will be preferably granular or mechanical. A large part of the sludge containing adsorbent reagent is sent back to the tank 4 by the pipe 12. This enables a large part of the adsorption reagent to be recycled. This helps to reduce the costs of the method. The part of the sludge extracted by the pipe 10 for its part is preferably sent either to a step for the biological treatment of water or towards sludge treatment.

A part of the clarified water 9 is collected and conveyed continuously towards the cell 8 which has a structure identical to that of the cell 2 and can also be protected by a confinement chamber 8a: it also comprises a vessel containing embryos of aquatic organisms 82 (OGM class 1) genetically modified so as to emit fluorescence when they come into contact with an endocrine disruptive and/or toxic and/or genotoxic pollutant. The embryos 82 are preferably of the same species as the embryos 22. The cell 8 also comprises a sensor capable of measuring the fluorescence emitted by the embryos 82. The measurement obtained is integrated by the regulation system (not shown).

The regulation system permanently or regularly computes the rate of reduction of the fluorescence in relation to the measurements made by the sensors of the cells 2 and 8. This rate expresses the rate of reduction of the concentration in compounds having a toxic, genotoxic or endocrine disruptive effect in a predictive manner.

The regulation system compares the fluorescence measured by means of the cell 8 with a reference threshold value of fluorescence corresponding to a concentration of such compounds beyond which a physiological impact can be observed. When the regulation system detects that the fluorescence measured by the cell b 8 is equal to or greater than the reference threshold value, a distribution of a quantity of fresh adsorbent reagent is activated almost immediately to increase the concentration of adsorbent reagent in the water to be treated.

Figure 3:
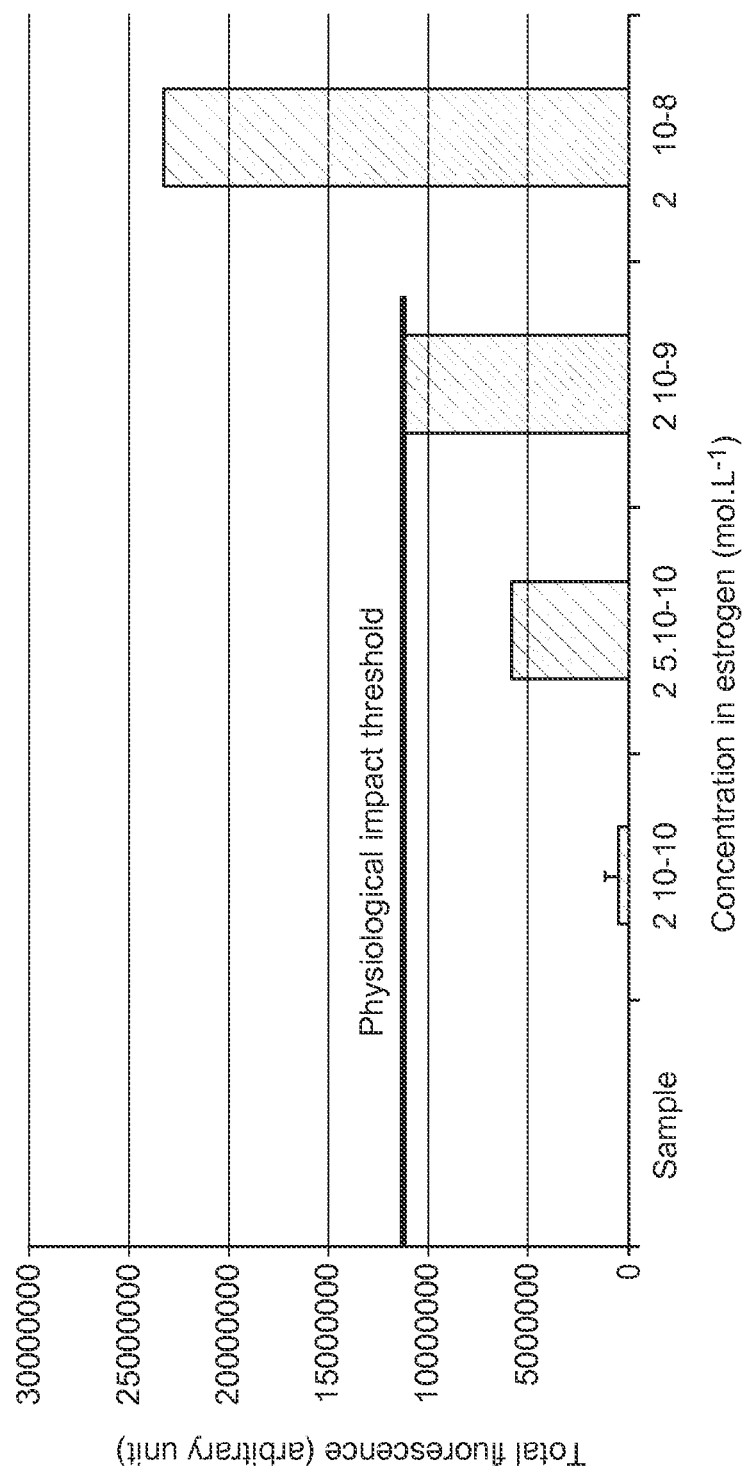
FIG. 3 is a graph presenting the results of trials of calibration of the method according to the invention on the measurement of estrogen hormones.

The cells 2 and 8 give results of intensity of fluorescence measured. These intensity values are related to the quantity of adsorbent reagent to be injected into the water to be treated according to a simple dose-response relationship, as illustrated in FIG. 3. Depending on the observations made on embryos of aquatic organisms, it is possible to determine a threshold of fluorescence beyond which a pathological state or established deleterious effects on embryo development are observed. These effects can be varied: malformations, embryo mortality, sex reversal disorder, slower growth, etc. This improved understanding of the toxicity of the compounds in water was not possible with prior-art methods.

6.2. Description of a Second Embodiment of the Invention

Figure 2:
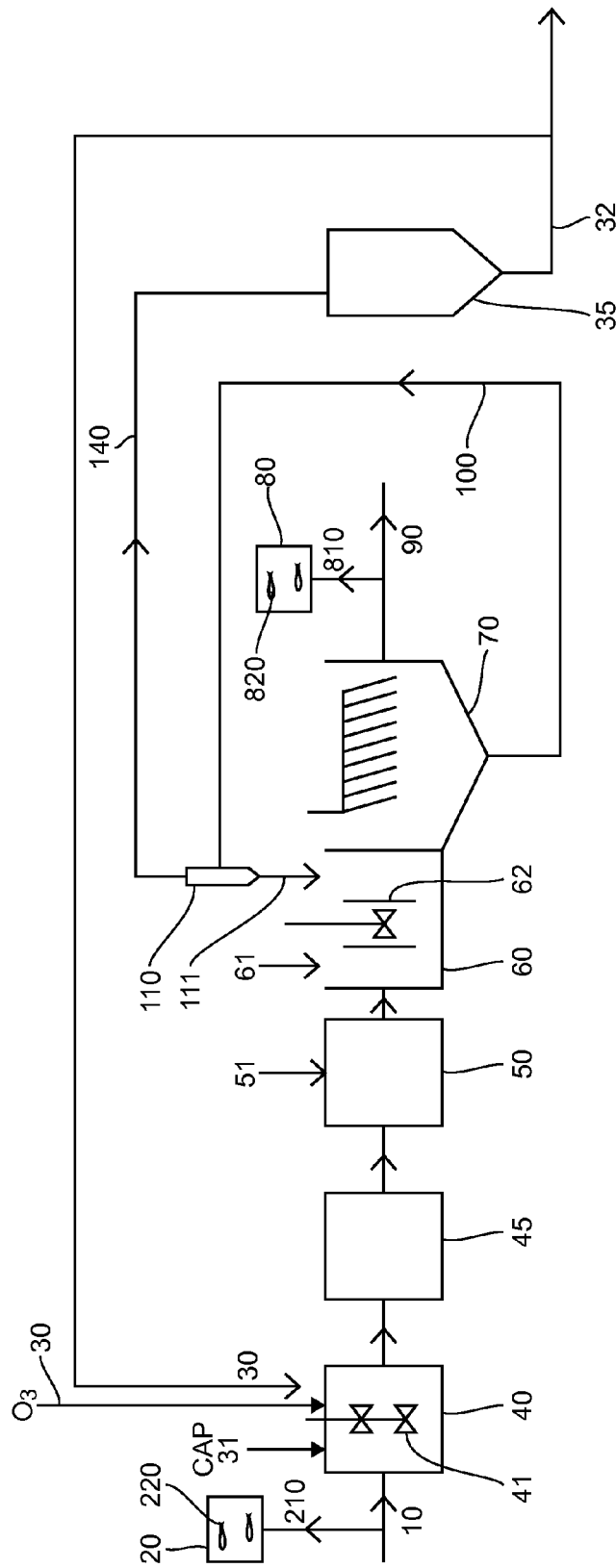
FIG. 2 is a block diagram of another embodiment of a plant for implementing the method according to the invention.

Referring to FIG. 2, we present a second embodiment of the invention.

The water to be treated enters a pipe 10. A part of the water to be treated is diverted by a pipe 210 to an upstream analysis cell 20. The analysis cell 20 comprises a basin containing the water to be treated in which embryos of aquatic organisms 220, such as amphibian larvae and genetically modified fish fingerlings are moving. This cell is also provided with means for detecting fluorescence, such as a sensor, enabling the detection, measurement and recording of the fluorescence emitted by the embryos 220. These means of detection are attached to a regulation system (not shown).

The water to be treated 10 then enters an adsorption tank 40 provided with stirring means 41 known as a pre-contact tank in order to be put into contact with the adsorbent reagent, in this case PAC, which, mainly, is adsorbent reagent that has been used 30, complemented as needed by fresh adsorbent reagent 31.

This step of adsorption is preferably coupled with a step of oxidation. In the context of the embodiment described, the coupled oxidation is done by an injection of ozone directly into the tank 40 through a pipe 42. In another embodiment, the injection of oxidant could be done by an injection upstream to the tank 40.

This pre-contact step can be continued if necessary in a mixing tank 45 before it undergoes a step of coagulation which can be done by means of static mixer 50 (or a stirred tank) and into which a coagulating reagent 51 is injected. It must be noted that the presence of the mixing tank 45 between the pre-contact tank 40 and the static mixer 30 is optional. The coagulated water is conveyed into a flocculation basin 60 into which there is injected flocculent 61 containing a flow guide 62. Simultaneously, a ballast 110 is injected. This ballast can be microsand or any other ballast material. This method is known as flocculation/decantation with ballasted flocs.

The water is then conveyed to a lamellar decanter 70 used to separate clarified and treated water 90 from the sludge 100. This sludge 100 is sent to a structure for separating ballast from the sludge, in this case a hydrocyclone 110, and then undergoes a thickening process 35. The sludge 32 thus thickened is separated in two parts: the major part containing adsorbent reagent 30 is returned to the front of the plant, in the pre-contact tank 40. The part 30 of the extracted sludge is sent either preferably to a step for the biological treatment of water or to a sludge treatment procedure.

The ballast recovered at the exit from the hydrocyclone is again injected for its part into the flow guide present in the flocculation basin 60.

A part of the clarified water 90 is picked up and conveyed continuously to the cell 80, the structure of which is identical to the cell 20.

A regulation system (not shown) integrates the signals emitted by the means for detecting fluorescence measured on the water to be treated and on the treated water, computes the rate of reduction of the fluorescence, compares it with a reference rate of reduction and activates a distribution of a quantity of fresh PAC if the rate of reduction observed is smaller than the reference rate. Depending on the signals emitted and on the calibration of the method, the regulation system can thus modify the quantity of adsorbent reagents to be injected, especially as regards fresh reagent 31 so as not to unnecessarily waste adsorbent reagent.

6.3. Calibration Test

A test of calibration of a plant to implement the method according to the invention was carried in order to determine an acceptable threshold value of endocrine disruptors in the treated water. This calibration test also makes it possible to distinguish the natural fluorescence of water and the basal fluorescence of genetically modified aquatic organisms, related to the normal functioning of the genes, from the fluorescence emitted by the same organisms when they detect the presence of an endocrine disrupting and/or toxic and/or genotoxic pollutant. The fluorescence of water and the basal fluorescence of the genetically modified aquatic organisms can be likened to background noise which must be evaluated in order to deduct it from the signal measured in the presence of a pollutant.

The disruptor chosen for example is estrogen which is found in urban wastewater. More specifically, larvae of genetically modified amphibians are placed in the presence of known and growing concentrations of estrogen in order to determine the maximum concentration that is acceptable in the treated water and that causes no physiological effect on larvae. These concentrations have been related to measured intensities of fluorescence. These results are presented in FIG. 3.

Naturally, instead of estrogen as a disruptor, it is possible to use any other molecule having an impact on the estrogen hormonal axis. In the same way, it is possible to use any other molecule having a thyroid impact.

From a reading of this graph, it can observed that amphibian larvae are sensitive to very low doses of estrogen such as ethinyl-oestradiol (EE2) ($2.5 \times 10^{-10}$ mol/L) and emit a detectable and quantifiable intensity of fluorescence. It is observed that the estrogen concentration leads to a physiological reversal starting from $2 \times 10^{-9}$ mol/L onwards. This concentration is related with the measured intensity of fluorescence. The corresponding intensity of fluorescence can then be recorded as the predetermined threshold value which will activate a regulation of the quantity of adsorbent reagent injected into the water to be treated.

6.4. Performance of the Method According to the Invention without Injection of Ozone The performance of the method according to the invention was evaluated for the treatment of municipal wastewater by the regular collection of samples of treated water at exit from the plant over a period of six months. The adsorbent reagent implemented for the adsorption step is powdered activated carbon in powder form by Norit® in a concentration of 10 ppm. The coagulant used is iron chloride $FeCl_3$ in a concentration of 4-5 mg/L expressed in Fe.

The performance characteristics of the method for treating water are summarized in Table 1 here below:

TABLE 1

Quality of treated water at exit from the plant

| Parameters | Average of measurements (mg/L) | Maximum measurements (mg/L) |
|---|---|---|
| Suspended matter | <3 | <5 |
| Chemical oxygen demand | 12.6 | 20 |
| Total organic carbon | 3.4 | 6.2 |
| Total phosphorous | <0.1 | <0.2 |

According to the table 1, the method according to the invention makes it possible to obtain clear, high-quality water suited to the aquatic life of the embryos referred to here above.

The performance of the method according to the invention for eliminating endocrine disruptors was also evaluated. Several molecules known for their harmful effect on health such as atenolol, benzotriazole, hydrochlorothiazide, benzafibrate, carbamazepine, clarithromycine, diclofenac, trimethoprim, venlafaxine, metoprolol, methyl-benzotriazol, mefenamic acid and primidone have been searched for and measured in the water to be treated and treated water. Except for benzotriazole which is generally corrosive, the other substances are known endocrine disruptors commonly looked for in laboratory analyses.

The performances of elimination are greater than 75% for atenolol, bentriazole and hydrochlorothiazole and greater than 80% for the other molecules. These results prove the efficacy of the method according to the invention in eliminating endocrine disruptive and/or toxic and/or genotoxic pollutants from water.

It will be noted that similar results were obtained with the plants shown in FIG. 1 and FIG. 2.

6.5. Performance of the Method According to the Invention with Injection of Ozone The performance of the method according to the invention, with ozone injection, was assessed for the treatment of municipal wastewater by regular collection of 65 samples of treated water at exit from a plant over a six-month period (June to December). The adsorbent reagent implemented for the adsorption step is powder activated carbon by Norit® in a concentration of 10 ppm. The coagulation used is iron chloride $FeCl_3$ with a concentration of 4-5 mg/L expressed in Fe. The oxidant used in this case is ozone and is injected into the contact tank in doses of 1 to 2 mg/l.

The performance levels of the method of the invention with ozone injection to eliminate endocrine disruptors were evaluated. Seven molecules known for their noxious role in health were searched for and measured in the water to be treated and in the treated water. Except for benzotriazole which is a corrosive agent, the other substances are known endocrine disruptors commonly searched for in laboratory analyses. The results of these analyses are summarized in the table 2 here below:

TABLE 1

Elimination of endocrine disruptors and toxic agents by the method of the invention

| Substance | Concentration in water to be treated (µg/L) | Concentration in treated water (µg/L) | Percentage of elimination (%) |
|---|---|---|---|
| Diclofenac | 1.093 | 0.034 | 97 |
| Carbamazepine | 1.288 | 0.014 | 99 |
| Hydochlorothiazide | 3.658 | 0.146 | 95 |
| Metoprolol | 0.05 | 0.01 | 76 |
| Sulfamethaxole | 0.256 | 0.03 | 88 |
| Atenolol | 0.142 | 0.018 | 82 |
| Benzotriazole | 11.075 | 0.301 | 97 |

Similar results were obtained with the plants shown in FIG. 1 and FIG. 2.

According to the results of these trials, the method according to the invention reduces the content of endocrine disruptive and/or toxic and/or genotoxic compounds in an especially efficient manner because the percentages of elimination of these substances on the whole exceed the value of 80%.

Thus, the method of the invention enables production of water presenting no environmental hazards and capable of then undergoing subsequent treatment.

7. VARIANTS

In one variant of the plant according to the invention, only the cell 8 is implemented: the regulation of the quantity of adsorbent reagent is then done by an adjustment and regulation loop making it possible to adjust the quantity of adsorbent reagents and oxidant injected into the water to be treated to the quality of water analyzed at exit. This alternative makes it possible to detect and palliate a possible malfunctioning of the plant.

In another variant, only the cell 2 is implemented: the quantity of adsorbent reagent is then regulated only according to the quality of incoming water, thus adapting the method for treating water to variations in the quality of the water to be treated.

The invention claimed is:

1. A method of treating water to reduce certain pollutants in the water that may introduce an endocrine disrupting effect, a toxic effect or a genotoxic effect, the method comprising:
    mixing an adsorbent reagent with the water to produce a water-adsorbent reagent mixture and adsorbing the pollutants in the water;
    subjecting the water-adsorbent reagent mixture to a liquid-solids separation process and producing treated water and sludge;
    contacting the water or treated water with at least one living aquatic organism wherein the value of at least one property of the living aquatic organism is correlated to the concentration of the pollutants in the water or treated water;
    evaluating the value of the property of the living aquatic organism; and
    adjusting the quantity of adsorbent reagent mixed with the water as a function of the value of the property of the living aquatic organism.

2. The method of claim 1 including chemically oxidizing the water during the adsorbing process or upstream of the adsorbing process.

3. The method of claim 1 wherein the quantity of adsorbent reagent mixed with the water is proportional to the value obtained by evaluating the value of the property of the living aquatic organism.

4. The method of claim 1 including injecting the adsorbent reagent into the water to be treated when the value obtained is greater than or equal to a predetermined threshold.

5. The method of claim 1 wherein the step of adjusting the quantity of adsorbent reagent mixed with the water during the adsorption process is performed as a function of the value obtained by evaluating the value of the property of the living aquatic organism.

6. The method of claim 1 including controlling the quality of the treated water produced by determining information representative of the quality of the treated water as a function of the value resulting from evaluating the value of the property of the living aquatic organism.

7. The method of claim 1 wherein the property of the living aquatic organism is a visual signal emitted by the living aquatic organism and wherein the intensity of the visual signal can be quantified and correlated with the concentration of pollutants in the water.

8. The method of claim 1 wherein the property of the living aquatic organism is a visual signal.

9. The method of claim 8 wherein the visual signal is fluorescence.

10. The method of claim 1 wherein the step of evaluating the value of the property
of the living aquatic organism is implemented in situ.

11. The method of claim 1 wherein the living aquatic organism is a genetically modified aquatic organism.

12. The method of claim 11 wherein said living aquatic organism is in the embryonic state.

13. The method of claim 12 wherein said living aquatic organism belongs to the group comprising fish and amphibians.

14. A system for treating water having pollutants therein comprising:
   an adsorption zone;
   an adsorption reagent injector site for directing an adsorbent reagent into the adsorption zone such that a water-adsorption reagent mixture is formed;
   a liquid-solids separator downstream from the adsorption zone for separating the water adsorbent reagent mixture into treated water and sludge;
   a zone for holding at least one living aquatic organism;
   the at least one aquatic organism being confined in the zone for holding the living aquatic organism; and
   wherein the living aquatic organism includes at least one property that has a value that is correlated with the concentration of the pollutants in the water to be treated.

15. The system of claim 14 including a chemical oxidation zone for chemically oxidizing the water to be treated.

16. The system of claim 15 wherein the chemical oxidation zone includes an ozonation tank disposed upstream of the adsorption zone.

* * * * *